United States Patent
Ross et al.

(10) Patent No.: US 7,034,886 B2
(45) Date of Patent: Apr. 25, 2006

(54) VIDEO PRODUCTION SWITCHER WITH INTEGRATED ASPECT RATIO CONVERTER

(75) Inventors: David Ross, Nepean (CA); Alun J Fryer, Nepean (CA); Pierre Deguerre, Kanata (CA); Troy English, Ottawa (CA)

(73) Assignee: Ross Video Limited, Ontario (CA)

( * ) Notice: Subject to any disclaimer, the term of this patent is extended or adjusted under 35 U.S.C. 154(b) by 0 days.

(21) Appl. No.: 09/768,316

(22) Filed: Jan. 25, 2001

(65) Prior Publication Data

US 2002/0024613 A1  Feb. 28, 2002

Related U.S. Application Data

(60) Provisional application No. 60/178,713, filed on Jan. 28, 2000.

(51) Int. Cl.
  *H04N 7/01* (2006.01)
(52) U.S. Cl. ................ 348/445; 348/705; 348/722
(58) Field of Classification Search ........... 348/705, 348/706, 722, 445, 553, 556, 584; 340/2.27, 340/2.28; 710/38
See application file for complete search history.

(56) References Cited

U.S. PATENT DOCUMENTS

| | | | | | |
|---|---|---|---|---|---|
| 4,984,081 | A | * | 1/1991 | Miyoshi et al. | 358/180 |
| 5,170,246 | A | * | 12/1992 | Griffen | 348/488 |
| 5,218,436 | A | * | 6/1993 | Sugiyama et al. | 348/445 |
| 5,325,131 | A | * | 6/1994 | Penney | 348/706 |
| 5,341,178 | A | * | 8/1994 | Ebihara | 348/705 |
| 5,353,065 | A | * | 10/1994 | Katsumata et al. | 348/556 |
| 5,365,276 | A | * | 11/1994 | Imai et al. | 348/556 |
| 5,416,598 | A | * | 5/1995 | Ezaki | 386/38 |
| 5,428,454 | A | * | 6/1995 | Kimura et al. | 358/335 |
| 5,638,485 | A | * | 6/1997 | Kobayashi et al. | 386/123 |
| 5,880,792 | A | * | 3/1999 | Ward et al. | 348/722 |
| 5,914,754 | A | * | 6/1999 | Kori et al. | 348/455 |
| 5,999,220 | A | * | 12/1999 | Washino | 348/441 |
| 6,229,574 | B1 | * | 5/2001 | Han | 348/555 |

FOREIGN PATENT DOCUMENTS

| | | | |
|---|---|---|---|
| JP | 04326265 A | * | 11/1992 |
| JP | 10032794 A | * | 2/1998 |

* cited by examiner

*Primary Examiner*—Victor R. Kostak
(74) *Attorney, Agent, or Firm*—Nixon Peabody LLP; Donald R. Studebaker

(57) ABSTRACT

A video production switcher converts an aspect ratio through the use of an integrated aspect ratio converter. Additionally, by having both converted and native format signals input to a switcher processor, the effective number of inputs can be doubled.

9 Claims, 2 Drawing Sheets

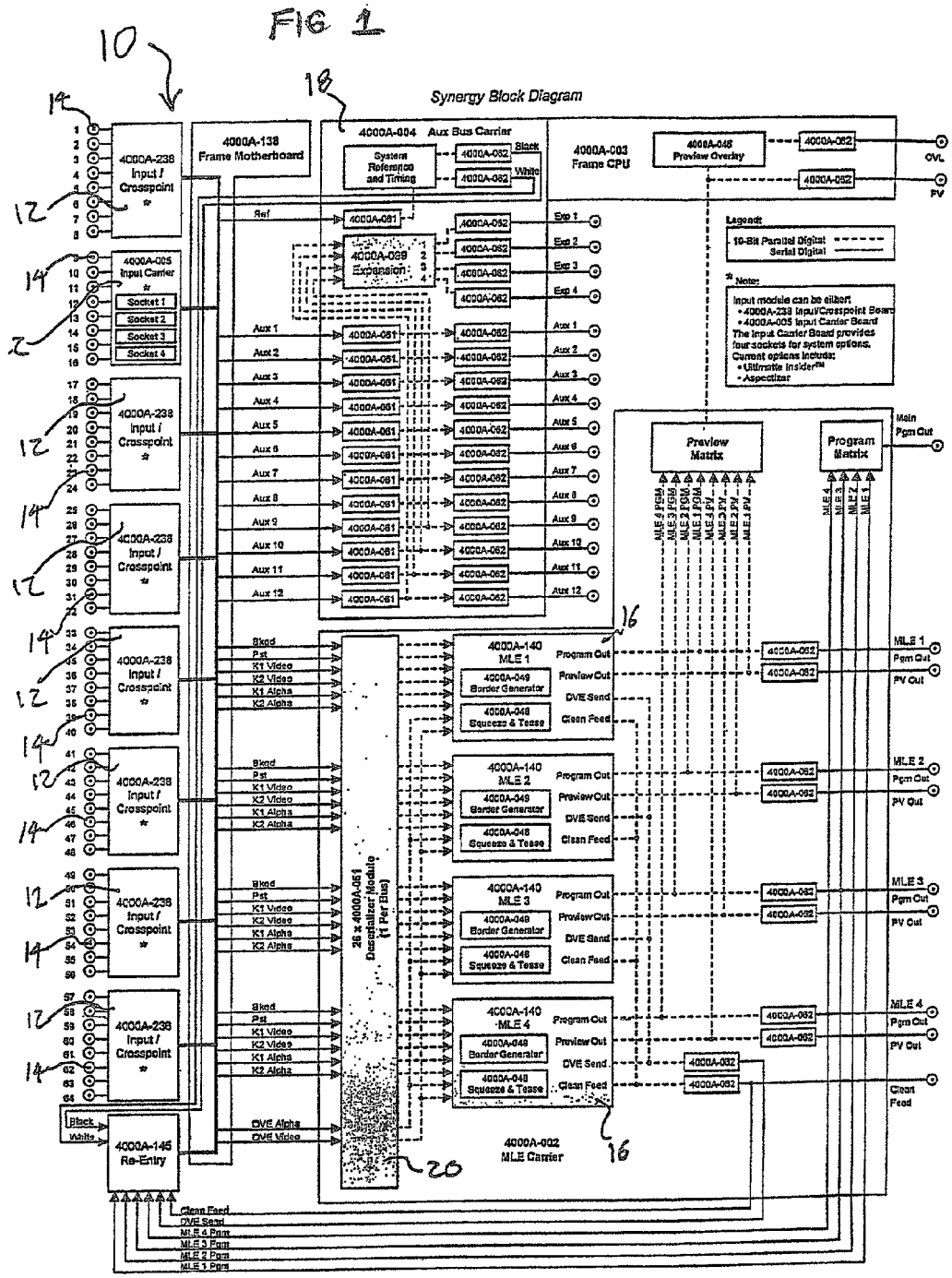

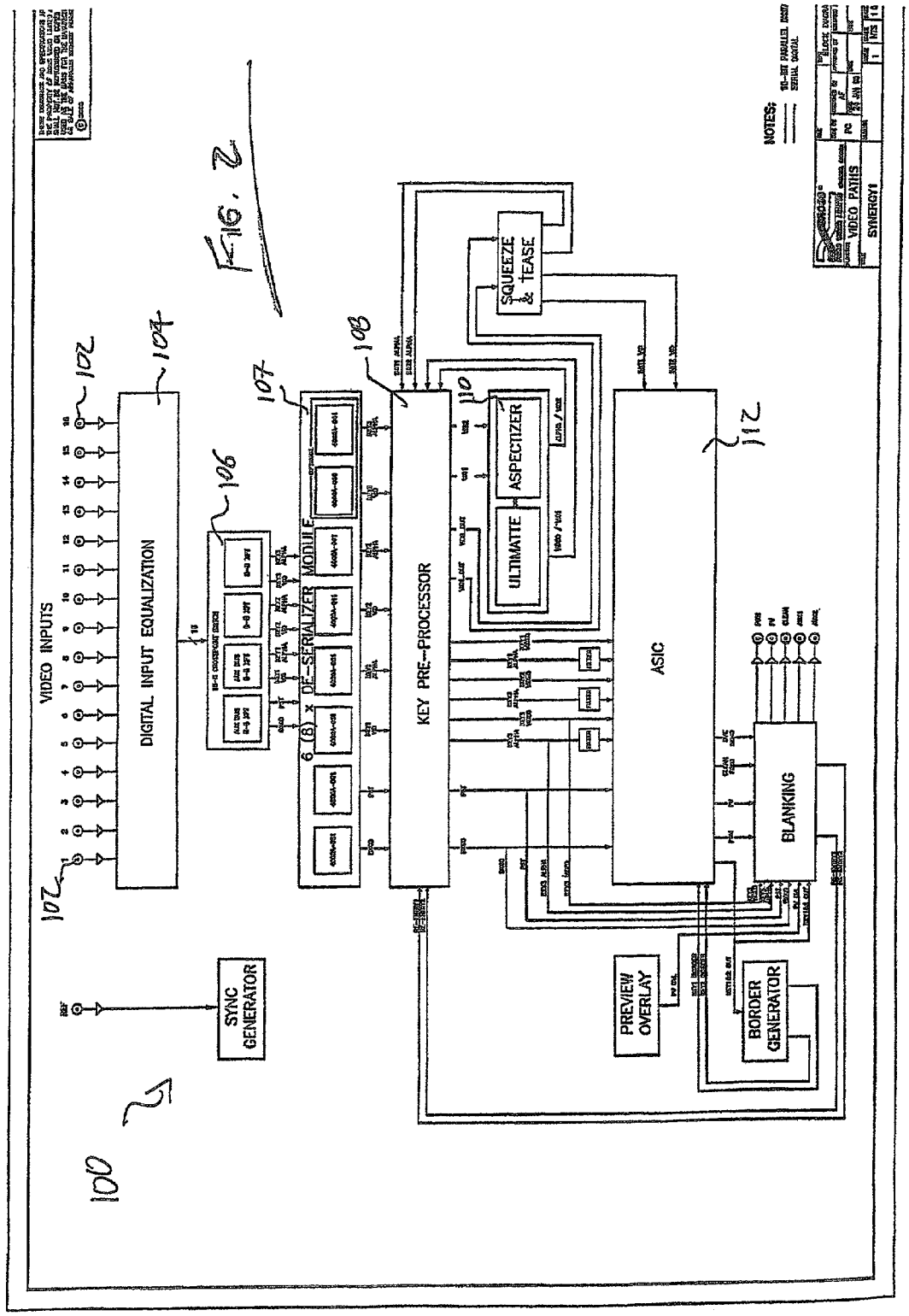

VIDEO PRODUCTION SWITCHER WITH INTEGRATED ASPECT RATIO CONVERTER

FIELD OF THE INVENTION

The present invention is directed to digital video switchers and, more particularly, to an improved digital video switcher having an aspect ratio conversion unit integrally incorporated therein and the attendant advantages of such a configuration.

BACKGROUND OF THE INVENTION

Every video picture's viewing dimensions can be represented by a ratio of the picture's width to the picture's height. This ratio is commonly referred to as the picture's aspect ratio. Industry standards and video equipment have developed, over the years, a limited number of aspect ratios in which video is displayed. For example, television receivers employing the NTSC system produce a video picture having a 4:3 aspect ratio. Conversely, digital television (DTV) pictures and typical movie pictures have aspect ratios of 16:9, and have significantly greater width to height ratios than the NTSC system. Digital television and movie pictures are generally referred to as "widescreen" and are considered to provide a more realistic picture since people normally perceive their surroundings with a greater sense of width than height.

Until recently, 16:9 movies, in order to be displayed on television sets, have been reformatted, or "cropped" so that only a center portion of the picture is displayed on the 4:3 television set. This is commonly referred to as "pan and scan" and is problematic in that it results in the loss of large amounts of video data beyond the scanned region. A common alternative to pan and scan is letterboxing. This maintains the 16:9 aspect ratio for the displayed picture and inserts black bars above and below the picture. Unfortunately, this method results in the loss of display "real estate."

Recently, with the advent of DTV and other forms of digital media such as digital video disks (DVD), television sets have been produced with widescreen 16:9 displays. These widescreen displays can play DTV and other 16:9 signals without loss of video data and without sacrificing display real estate. However, a widescreen 16:9 display provided with a NTSC 4:3 input signal will typically insert black curtains on the sides of the original 4:3 picture.

A problem exists in the field of video production and broadcasting when a video production switcher is presented with input signals having both 4:3 and 16:9 aspect ratios. While it is possible that DTV will result in new video sources and footage being shot in the widescreen 16:9 aspect ratio, broadcasters will still have to deal with a large quantity of archive and file footage. Further, during the DTV phase in period, which is likely to take many years, many video sources will continue to film in standard NTSC 4:3 format. If no conversion between aspect ratios is made, a 4:3 display will squeeze a 16:9 input signal so that the entire picture fits within the smaller display, making the picture skinny. Similarly, a 16:9 display will expand a 4:3 input signal, making the picture look fat. This problem drastically reduces the ability of the broadcaster to successfully mix video signals having different aspect ratios.

Video mixing is typically accomplished via a mixing system, known in the art as a video switcher. The purpose of a switcher is to mix a plurality of sources of video into a single video signal ultimately to be broadcast or recorded as a single image, either still or dynamic. Known switchers create effects such as wipes, dissolves and keys. For example, a switcher can change scenes by "wiping" from one scene to another, or by dissolving one scene into another directly, or via a neutral, e.g., black, background. Additionally, a switcher can mix the output of a character generator, for example, with a background input, thereby "layering" text on top of the background in accordance with a particular key signal, e.g., a self key, luminance key or a preset patternkey. Known switchers can take virtually any input signal and layer that signal on virtually any background.

Generally, a switcher includes at least one and usually multiple multi-level effects (MLE) amplifiers or mixers, each capable of mixing two or more video inputs to create a single video output signal. If it is desired to produce a composite image that includes more signals than a single MLE can accommodate, then the output of one MLE can be fed into the input of a second downstream MLE where further layering can be accomplished. This process can continue until all available MLEs on the switcher are consumed, whereby a highly complicated video image can be devised. Aspect ratio conversion of input video signals is necessary to enable video signals of different aspect ratios to be mixed together.

Prior art solutions to this problem have included the use of an external aspect ratio converter (ARC) to manipulate an incoming video signal from either 16:9 to 4:3 or from 4:3 to 16:9. The ARC is typically connected to a video switcher input to provide an aspect ratio converter input. The output input must also be provided directly to the switcher. The ARC must be fed by a switcher auxiliary bus. Although operative for converting the aspect ratio of an input signal, this system tends to be relatively complex and difficult to set up. Further, a separate auxiliary bus is necessary to exploit the functionality of an ARC. Thus, multiple additional cables and connectors are required to set up the proper connections between the video switcher and external ARC. Moreover, in operation, a switcher operator must initiate the use of the external ARC by depressing buttons to access the auxiliary bus and properly route the desired video signal through the ARC and back into the switcher. If the switcher operator wants to use the original video signal, this signal must be manually chosen on the switcher. In modern, fast-paced, real time video production, however, these additional set up requirements and elaborate operator controls are highly undesirable.

Additionally, control of an ARC in the prior art typically resides with the ARC itself, not with a control panel of a switcher. Accordingly, ARC implemented conversions must be set up in the ARC beforehand, as it is difficult to reprogram an ARC and control a switcher at the same time. This again hampers a switcher operator from fast-paced video editing since only effects previously arranged or programmed can be implemented.

OBJECTS OF THE INVENTION

Therefore, it is an object of the present invention to provide a video production switcher having an integrated aspect ratio converter for providing aspect ratio conversion of a plurality of input sources.

Another object of the present invention is to effectively double the total number of inputs to the switcher by providing both converted an native format signals to the switcher processor.

Other objects, features, and advantages of the present invention will become apparent from the following detailed description.

BRIEF DESCRIPTION OF THE FIGURES

The present invention can be understood more completely by reading the following Detailed Description of exemplary embodiments, in conjunction with the accompanying drawings, in which:

FIG. 1 is a schematic diagram of a first embodiment of a video switcher in accordance with the present invention; and FIG. 2 is a schematic diagram of a second embodiment of a video switcher in accordance with the present invention.

DESCRIPTION OF THE INVENTION

Embodiment 1

The preferred embodiments of the present invention will now be described with reference to the Figures. FIG. 1 schematically depicts a video switcher 10 including a plurality of input modules 12 each having eight (8) video signal inputs 14. Each input module 12 is a crosspoint matrix that supports 40 bus outputs, including backgrounds, presets, key 1 video signals, key 2 video signals, etc. Any input can be routed to any output, or the input can be turned off without feeding any bus. Turning off the input permits an input from another input module 12 to feed the bus. The various outputs from the crosspoint matrices are provided to at least one Multi-Level Effects (MLE) Carrier board 16 for generating effects using the input signals or an Auxiliary (Aux) Bus Carrier board 18. Prior to delivery to the MLE Carrier board 16, the signals are fed through respective deserializer modules 20 to convert the serial signals into parallel signals for manipulation by the MLE. Each MLE generator typically includes two keyers and a video signal mixer for processing the input video signals in a variety of known manners.

In accordance with one embodiment of the present invention, one of the input modules 12 is replaced with an input carrier module 22. Input carrier module 22 includes all of the features of the input modules 12 including 8 inputs and a crosspoint matrix for routing the input signals. In addition to these elements, the input carrier also includes a pair of aspect ratio converters for converting the aspect ratio of any two selected input signals. The video signals input into the input carrier 22 are first run through the crosspoint matrix whereupon any two signals selected by the operator are routed to a de-serializer for converting the serial input signals into parallel signals. The parallel input signals are then each delivered to a respective ARC. One of these signals becoming the background and the other becoming the preset. In other words, one signal includes the starting image and the other signal includes the ending image. At least two ARCs are required to manipulate video signals in this manner, since it is possible that both the background and preset signals need to be converted prior to processing. The output from the ARCs is then re-serialized. It should be noted that the input carrier 22 outputs both the converted video signals as well as unconverted or native video signals provided to the ARCs. By adding additional ARCs, it is possible to convert each of the 8 input video signals, thereby effectively doubling the number of inputs into the input carrier. In this fashion, key signals and digital video effect (DVE) signals can also be aspect ratio converted. The output signals from the input carrier 22 are then run through a crosspoint matrix which includes the outputs of all input modules 12. This permits the outputs from any of the input modules 12 and the input carrier 22 to be routed through associated deserializer modules 20 and into particular inputs on an MLE 16.

By providing at least two ARCs after the crosspoint matrix on the input carrier 22, as many as eight input signals can be aspect ratio converted. In the prior art external method, aspect ratio conversion of eight input signals would take sixteen individual ARCs. The present invention greatly simplifies the aspect ratio conversion process and also significantly reduces the cost and complexity of the operation.

Additional features of the video switcher 10 are outside the scope of the present invention and are more fully described in co-pending Provisional Application Ser. No. 60/117,676 the contents of which are incorporated by reference herein.

Embodiment 2

Referring now to FIG. 2, there can be seen a second embodiment of the present invention including a video switcher 100. Switcher 100 includes sixteen digital video inputs 102 which are subsequently equalized by digital input equalizer 104. The outputs of equalizer 104 are then delivered to crosspoint matrix 106 which enables the input signals to be routed to various outputs including background, preset, key 1 video signal, key 2 video signals, etc. The outputs of the crosspoint matrix 106 are then presented to a deserializer module 107 for converting the serial input signals into parallel signals. These signals are then presented to key pre-processor 108 for preparing the various keys from the received signals. Operator selected background and present signals are output from the key pre-processor 108 as vid 1 and vid 2 and presented to an aspect ratio conversion module 110. The aspect ratio conversion module 110 includes a pair of ARCs (not shown) for aspect ratio converting the background and preset signal. Once converted, the converted vid 1 and vid 2 signals as well as the native vid 1 and vid 2 signals are routed back into the key pre-processor. A small crosspoint matrix in the key pre-processor permits the vid 1 and vid 2 signals, as well as the additional input signals to be routed to particular inputs on an application specific integrated circuit (ASIC) 112 which processes the signals in accordance with preprogrammed instructions.

By providing a pair of ARCs in an aspect ratio conversion mode 110 after the crosspoint matrix 106 and the deserializer module 107, each and every video input 102 can be aspect ratio converted using only two ARCs. This is due by routing any of the selected inputs to the vid 1 and vid 2 outputs of the key pre-processor. This greatly simplifies and reduces the cost of this procedure over known conversion systems. Further, in comparison with the first embodiment, by providing the aspect ratio conversion module after the deserializer 107 and key pre-processor 108, the aspect ratio converter module does not need to deserialize and re-serialize the output signals, respectively. The elimination of a redundant deserializer and re-serializer combination also reduces the expense and complexity of the system.

We claim:

1. A video switcher, comprising:

a plurality of inputs for receiving a respective plurality of input video signals of mixed aspect ratios;

a plurality of aspect ratio converters integrated within the video switcher and configured for generating respective aspect ratio converted background and preset signals based on the input video signals;

means for providing both the aspect ratio converted background and preset signals and the input video signals as outputs; and a crosspoint matrix and a deserializer module provided before the plurality of aspect ratio converters.

2. The video switcher of claim 1, further comprising:

means for receiving signals having a converted and a native signal format; and means for combining the received signals having the converted and the native signal format into a composite effect.

3. The video switcher of claim 1, wherein the switcher is adapted to control parameters including at least one of pan and scan and letterbox.

4. The video switcher of claim 1, wherein the switcher allows integrated control of Up Convert and Down Convert processes.

5. The video switcher of claim 1, wherein the switcher is adapted to control downstream switching between converted and non-converted signal formats.

6. The video switcher of claim 1, further comprising means for combining one or more of the plurality of the input video signals to form a composite video signal.

7. The video switcher of claim 1, further comprising means for converting the aspect ratio of any two selected input video signals via the plurality of aspect ratio converters.

8. The video switcher of claim 1, further comprising a crosspoint matrix provided before the plurality of aspect ratio converters.

9. A video switcher, comprising:

a plurality of inputs for receiving a respective plurality of input video signals of mixed aspect ratios;

a plurality of aspect ratio converters integrated within the video switcher and configured for generating respective aspect ratio converted background and preset signals based on the input video signals;

means for providing both the aspect ratio converted background and preset signals and the input video signals as outputs; and a deserializer module and a key processor provided before the plurality of aspect ratio converters.

* * * * *

UNITED STATES PATENT AND TRADEMARK OFFICE
CERTIFICATE OF CORRECTION

PATENT NO. : 7,034,886 B2  Page 1 of 1
APPLICATION NO. : 09/768316
DATED : April 25, 2006
INVENTOR(S) : David Ross et al.

It is certified that error appears in the above-identified patent and that said Letters Patent is hereby corrected as shown below:

TITLE PAGE, ITEM [75] Inventors, delete "Pierre Deguerre, Kanata (CA)" and replace with --Pierre Deguire, Kanata (CA)--

Signed and Sealed this

Fourteenth Day of November, 2006

JON W. DUDAS
*Director of the United States Patent and Trademark Office*